United States Patent [19]

Vu

[11] Patent Number: 5,623,601
[45] Date of Patent: Apr. 22, 1997

[54] APPARATUS AND METHOD FOR PROVIDING A SECURE GATEWAY FOR COMMUNICATION AND DATA EXCHANGES BETWEEN NETWORKS

[75] Inventor: Hung T. Vu, Ottawa, Canada

[73] Assignee: Milkway Networks Corporation, Ottawa, Canada

[21] Appl. No.: 342,772

[22] Filed: Nov. 21, 1994

[51] Int. Cl.$^6$ .................................................. G06F 11/00
[52] U.S. Cl. .............................. 395/187.01; 395/188.01
[58] Field of Search ...................... 395/187.01, 188.01, 395/186, 182.02, 187.02, 180; 380/4

[56] References Cited

U.S. PATENT DOCUMENTS

| | | | |
|---|---|---|---|
| 5,023,907 | 6/1991 | Johnson et al. | 380/4 |
| 5,416,842 | 5/1995 | Aziz et al. | 380/4 |
| 5,548,646 | 8/1996 | Aziz et al. | 380/23 |

OTHER PUBLICATIONS

Stempel, "Ipaccess–an Internet Service Access System for Firewall Installations", Network and Distributed System Security, IEEE, pp. 31–41. Feb. 1995.
Nueman, "Proxy–Based Authproization and Accounting for Dsitributed Systems", Distributed Computing systems, IEEE Conf. pp. 283–291. Jan. 1993.
Bellovin et al., "Network Firewalls", IEEE Communications Magazine. pp. 50–57 Sep. 1994.
Tirenin et al., "Enhanced Multinet Gateway: Survivable Multi–Level Secure Data Communications", Milcom IEEE, pp. 740–744 1991.
A Network Firewall, Marcus J. Ranum, Digital Equipment Corporation, Washington Open Systems Resource Center, Greenbelt, MD, Jun. 12, 1992.
White Paper–InterLock$^{SM}$ 2.1, Ans Co+Re Systems, Inc., Aug. 18, 1993.
Checkpoint Firewall–1™–Technical White Paper, CheckPoint Software Technologies Ltd., 1994.
Thinking about Firewalls, Marcus J. Ranum, Trusted Information Systems, Inc. Glenwood, Md, 1993.
Socks, David Koblas and Michelle Koblas, 1993.
Internet Firewalls – An Overview, Marcus J. Ranum, A slide presentation, 1993, Trusted Information Systems, Inc.
Screen External Access Link (SEAL) Introductory Guide, Digital, publication date unknown.
Increasing Security on IP Networks, Cisco Systems, Inc., advertising brochure, publication date unknown.

*Primary Examiner*—Robert W. Beausoliel, Jr.
*Assistant Examiner*—Joseph E. Palys
*Attorney, Agent, or Firm*—Ralph H. Dougherty

[57] ABSTRACT

An apparatus and method for providing a secure firewall between a private network and a public network are disclosed. The apparatus is a gateway station having an operating system that is modified to disable communications packet forwarding, and further modified to process any communications packet having a network encapsulation address which matches the device address of the gateway station. The method includes enabling the gateway station to transparently initiate a first communications session with a client on a first network requesting a network service from a host on a second network, and a second independent communications session with the network host to which the client request was addressed. The data portion of communications packets from the first session are passed to the second session, and vice versa, by application level proxies which are passed the communications packets by the modified operating system. Data sensitivity screening is preferably performed on the data to ensure security. Only communications enabled by a security administrator are permitted. The advantage is a transparent firewall with application level security and data screening capability.

41 Claims, 7 Drawing Sheets

IP Header (Prior Art)

TCP Header (Prior Art)

UDP Header (Prior Art)

APPARATUS AND METHOD FOR PROVIDING A SECURE GATEWAY FOR COMMUNICATION AND DATA EXCHANGES BETWEEN NETWORKS

TECHNICAL FIELD

This application relates generally to internetwork communications and data exchanges and, in particular, to secure gateways which serve as firewalls between computer networks to inhibit electronic vandalism and espionage.

BACKGROUND OF THE INVENTION

As computing power and computer memory have been miniaturized and become more affordable, computer networks have largely displaced mainframe and minicomputer technology as a business automation platform. Public information networks have also sprung up around the world. The largest and most pervasive public network is the Internet which was created in the late 1960s as a United States Department of National Defence project to build a network connecting various military sites and educational research centers. While the interconnection of private networks with public networks such as the Internet may provide business opportunities and access to vital information, connecting a private, secure network to a public network is hazardous unless some form of secure gateway is installed between the two networks to serve as a "firewall".

Public networks, as their name implies, are accessible to anyone with compatible hardware and software. Consequently, public networks attract vandals as well as amateurs and professionals involved in industrial espionage. Private networks invariably store trade secret and confidential information which must be protected from exposure to unauthorized examination, contamination, destruction or retrieval. Any private network connected to a public network is vulnerable to such hazards unless the networks are interconnected through a secure gateway which prevents unauthorized access from the public network.

A great deal of effort has been dedicated to developing secure gateways for internetwork connection. As noted above, these gateways are commonly referred to as firewalls. The term firewall is broadly used to describe practically any internetwork security scheme. Firewalls are generally developed on one or more of three models: the screening router, the bastion host and the dual homed gateway. These models may be briefly defined as:

Screening router—Screening routers typically have the ability to block traffic between networks or specific hosts on an IP port level. Screening routers can be specially configured commercial routers or host-based packet filtering applications. Screening routers are a basic component of many firewalls. Some firewalls consist exclusively of a screening router or a packet filter.

Bastion host—Bastion hosts are host systems positioned between a private network and a public network which have particular attention paid to their security. They may run special security applications, undergo regular audits, and include special features such as "sucker traps" to detect and identify would-be intruders.

Dual homed gateway—A dual homed gateway is a bastion host with a modified operating system in which TCP/IP forwarding has been disabled. Therefore, direct traffic between the private network and the public network is blocked. The private network can communicate with the gateway, as can the public network but the private network cannot communicate with the public network except via the public side of the dual homed gateway. Application level or "proxy" gateways are often used to enhance the functionality of dual homed gateways. Much of the protocol level software on networks operates in a store-and-forward mode. Prior art application level gateways are service-specific store-and-forward programs which commonly operate in user mode instead of at the protocol level.

All of the internetwork gateways known to date suffer from certain disadvantages which compromise their security or inconvenience users. Most known internetwork gateways are also potentially susceptible to intruders if improperly used or configured.

The only firewall for many network installations is a screening router which is positioned between the private network and the public network. The screening router is designed to permit communications only through certain predesignated ports. Many network services are offered on specific designated ports. Generally, screening routers are configured to permit all outbound traffic from the private network while restricting inbound traffic to those certain specific ports allocated to certain network services. A principal weakness of screening routers is that the router's administrative password may be compromised. If an intruder is capable of communicating directly with the router, the intruder can very easily open the entire private network to attack by disabling the screening algorithms. Unfortunately, this is extremely difficult to detect and may go completely unnoted until serious damage has resulted. Screening routers are also subject to permitting vandalism by "piggybacked" protocols which permit intruders to achieve a higher level of access than was intended to be permitted.

Packet filters are a more sophisticated type of screening that operates on the protocol level. Packet filters are generally host-based applications which permit certain communications over predefined ports. Packet filters may have associated rule bases and operate on the principle of "that which is not expressly permitted is prohibited". Public networks such as the Internet operate in TCP/IP protocol. A UNIX operating system running TCP/IP has a capacity of 64K communication ports. It is therefore generally considered impractical to construct and maintain a comprehensive rule base for a packet filter application. Besides, packet filtering is implemented using the simple Internet Protocol (IP) packet filtering mechanisms which are not regarded as being robust enough to permit the implementation of an adequate level of protection. The principal drawback of packet filters is that they are executed by the operating system kernel and there is a limited capacity at that level to perform screening functions. As noted above, protocols may be piggybacked to either bypass or fool packet filtering mechanisms and may permit skilled intruders to access the private network.

The dual homed gateway is an often used and easy to implement alternative. Since the dual homed gateway does not forward TCP/IP traffic, it completely blocks communication between the public and private networks. The ease of use of a dual homed gateway depends upon how it is implemented. It may be implemented by giving users logins to the public side of the gateway host, or by providing application gateways for specific services. If users are permitted to log on to the gateway, the firewall security is seriously weakened because the risk of an intrusion increases substantially, perhaps exponentially, with each user login due to the fact that logins are a vulnerable part of any security system. Logins are often compromised by a number of known methods and are the usual entry path for intruders.

The alternative implementation of a dual homed gateway is the provision of application gateways for specific network services. Application gateways have recently gained general acceptance as a method of implementing internetwork firewalls. Application gateways provide protection at the application level and the Transmission Control Protocol (TCP) circuit layer. They therefore permit data sensitivity checking and close loopholes left in packet filters. Firewalls equipped with application gateways are commonly labelled application level firewalls. These firewalls operate on the principle of "that which is not expressly permitted is prohibited". Users can only access public services for which an application gateway has been installed on the dual homed gateway. Although application level firewalls are secure, the known firewalls of this type are also inefficient. The principal disadvantage of known application level firewalls is that they are not transparent to the user. They generally require the user to execute time-consuming extra operations or to use specially adapted network service programs. For example, in an open connection to the Internet, a user can Telnet directly to any host on the Internet by issuing the following command:

Telnet target.machine

However if the user is behind an application level firewall, the following command must be issued:

Telnet firewall

After the user has established a connection with the firewall, the user will optionally enter a user ID and a password if the firewall requires authentication. Subsequent to authentication, the user must request that the firewall connect to the final Telnet target machine. This problem is the result of the way in which the UNIX operating system handles IP packets. A standard TCP/IP device will only accept and attempt to process IP packets addressed to itself. Consequently, if a user behind an application firewall issues the command:

Telnet target.machine an IP packet will be generated by the user workstation that is encapsulated with the device address of the firewall but with an IP destination address of the target.machine. This packet will not be processed by the firewall station and will therefore be discarded because IP packet forwarding has been disabled in the application level firewall.

Known application level firewalls also suffer from the disadvantage that to date application interfaces have been required for each public network service. The known application level firewalls will not support "global service" or applications using "dynamic port allocations" assigned in real time by communicating systems.

Users on private networks having an application level firewall interface therefore frequently install "back doors" to the public network in order to run services for which applications have not been installed, or to avoid the inconvenience of the application gateways. These back doors provide an unscreened, unprotected security hole in the private network which renders that network as vulnerable as if there were no firewall at all.

SUMMARY OF THE INVENTION

It is an object of the invention to provide an internetwork security gateway which overcomes the known disadvantages of prior art internetwork security gateways.

It is a further object of the invention to provide an internetwork security gateway which provides application proxy flexibility, security and control while permitting users to transparently access public network services.

It is a further object of the invention to provide an internetwork security gateway which supports any currently offered or future network service.

It is yet a further object of the invention to provide an internetwork security gateway which supports applications using port numbers that are dynamically assigned in real time by the communicating systems.

It is yet a further object of the invention to provide an internetwork security gateway which listens to all communications ports in order to detect any attempted intrusion into a protected network, regardless of the intruder's point of attack.

In accordance with a first aspect of the invention there is disclosed a method of providing a secure gateway between a private network and a potentially hostile network, comprising the steps of:

a) accepting from either network all communications packets that are encapsulated with a hardware destination address that matches the device address of the gateway;

b) determining whether there is a process bound to a destination port number of an accepted communications packet;

c) establishing a first communications session with a source address/source port of the accepted communications packet if there is a process bound to the destination port number, else dropping the packet;

d) establishing a second communications session with a destination address/destination port number of the accepted communications packet if a first communications session is established; and e) transparently moving data associated with each subsequent communications packet between the respective first and second communications sessions, whereby the first session communicates with the source and the second session communicates with the destination using the data moved between the first and second sessions.

In accordance with a further aspect of the invention there is disclosed an apparatus for providing a secure gateway for data exchanges between a private network and a potentially hostile network, comprising in combination:

a gateway station adapted for connection to a telecommunications connection with each of the private network and the potentially hostile network;

an operating system executable by the gateway station, a kernel of the operating system having been modified so that the operating system:

a) cannot forward any communications packet from the private network to the potentially hostile network or from the potentially hostile network to the private network; and b) will accept for processing any communications packet from either of the private network and the potentially hostile network provided that the packet is encapsulated with a hardware destination address that matches the device address of the gateway station on the respective networks; and at least one proxy process executable by the gateway station, the proxy process being adapted to transparently initiate a first communications session with a source of an initial data packet accepted by the operating system and to transparently initiate a second communications session with a destination of the packet, and to transparently pass a data portion of packets received by the first communications session to the second communications session and to pass the data portion of packets received by the second communications session to the first communications session, whereby the first session communicates with the source using data from the second session and the second session communicates with the destination using data received from the first session.

The invention therefore provides a method and an apparatus which permits a private network to be securely interconnected with a public or a potentially hostile network.

The method in accordance with the invention involves protecting a private network interconnected with a potentially hostile network whereby a gateway between the two networks transparently imitates a host when a communication data packet is received from a client on one of the networks by initiating a communication session with the client. If the client is determined to have access rights to the requested service, the gateway station imitates the client to the host on the other network by initiating a communications session with the host. Thereafter, data is passed between the client session and the host session by a process which coordinates communications between the two distinct, interdependent communications sessions which proceed between the client and the gateway station and the host and the gateway station.

For instance, using a gateway station in accordance with the invention as an internetwork interface, a user on the private network can issue the command:

telnet publictarget.machine and the command will appear to the user to be executed as if no gateway existed between the networks so long as the user is permitted by the rule bases maintained by the private network security administrator to access the publictarget machine.

In order to achieve transparency of operation, the gateway station is modified to accept for processing all IP packets encapsulated in a network operating system capsule (e.g. an ethernet capsule) having a destination address which matches the device address of the gateway station, regardless of the destination address of the IP packet. This modification permits the gateway station to provide transparent service to users on either network, provided the users are authorized for the service. Furthermore, the gateway station in accordance with the invention runs a novel generic proxy which permits it to listen to all of the 64K communications ports accommodated by the UNIX operating system which are not served by a dedicated proxy process. As is well known to those skilled in the art, certain internetwork services have been assigned specific ports for communication. Most of the designated ports on the Internet are those port numbers in the range of 0-1K (1,024). Other applications and services use port numbers in the range of 1K to 64K. As noted above, the gateway station in accordance with the invention "listens" to all 64K ports. The generic proxy process which is executed by the gateway station responds to any request for service that is not served by a dedicated proxy process, regardless of the destination port number to which the request for service is made. Every request for service may therefore be responded to. When an intruder attacks a private network, the intruder must attempt to access the network through the gateway station. Most firewalls listen to only a limited subset of the available communications ports. An intruder can therefore probe unattended areas of the firewall without detection. The gateway station in accordance with the invention will, however, detect a probe on any port and may be configured to set an alarm condition if repeated probes are attempted. The gateway station in accordance with the invention can also be configured to perform data sensitivity screening because all communications packets are delivered by the kernel to the application level where the data portion of each packet is passed from one in progress communications session to the other. Data sensitivity screening permits the detection of sophisticated intrusion techniques such as piggybacked protocols, and the like.

The apparatus in accordance with the invention is modeled on the concept of a bastion host, preferably configured as a dual home firewall. The apparatus in accordance with the invention may also be configured as a multiple-home firewall, a single-home firewall or a screened subnet. Regardless of the configuration, the apparatus preferably comprises a UNIX station which executes a modified operating system in which IP packet forwarding is disabled. The apparatus in accordance with the invention will not forward any IP packet, process ICMP direct messages nor process any source routing packet between the potentially hostile network and the private network. Without IP packet forwarding, direct communication between the potentially hostile network and the private network are disabled. This is a common arrangement for application level firewalls. The apparatus in accordance with the invention is, however, configured to provide a transparent interface between the interconnected networks so that clients on either network can run standard network service applications transparently without extra procedures, or modifications to accomplish communications across the secure gateway. This maximizes user satisfaction and minimizes the risk of a client establishing a "back door" to a potentially hostile network.

The methods and the apparatus in accordance with the invention therefore provide a novel communications gateway for interconnecting private and public networks which permit users to make maximum use of public services while providing a tool for maintaining an impeccable level of security for the private network.

BRIEF DESCRIPTION OF THE DRAWINGS

A preferred embodiment of the invention will now be further explained by way of example only and with reference to the following drawings, wherein:

FIG. 7b is a second portion of the flow diagram shown in FIG. 7a.

DETAILED DESCRIPTION OF THE PREFERRED EMBODIMENT

Most UNIX hosts communicate using TCP/IP protocol. The preferred embodiment of the invention is therefore constructed from a UNIX station having a UNIX operating system. While the preferred embodiment of the invention described below is explained with particular reference to the UNIX environment, it is to be well understood by those skilled in the art that the principles, concepts and methods described may be readily adapted to function with other internetwork communication protocols in other operating environments.

Figure 1:
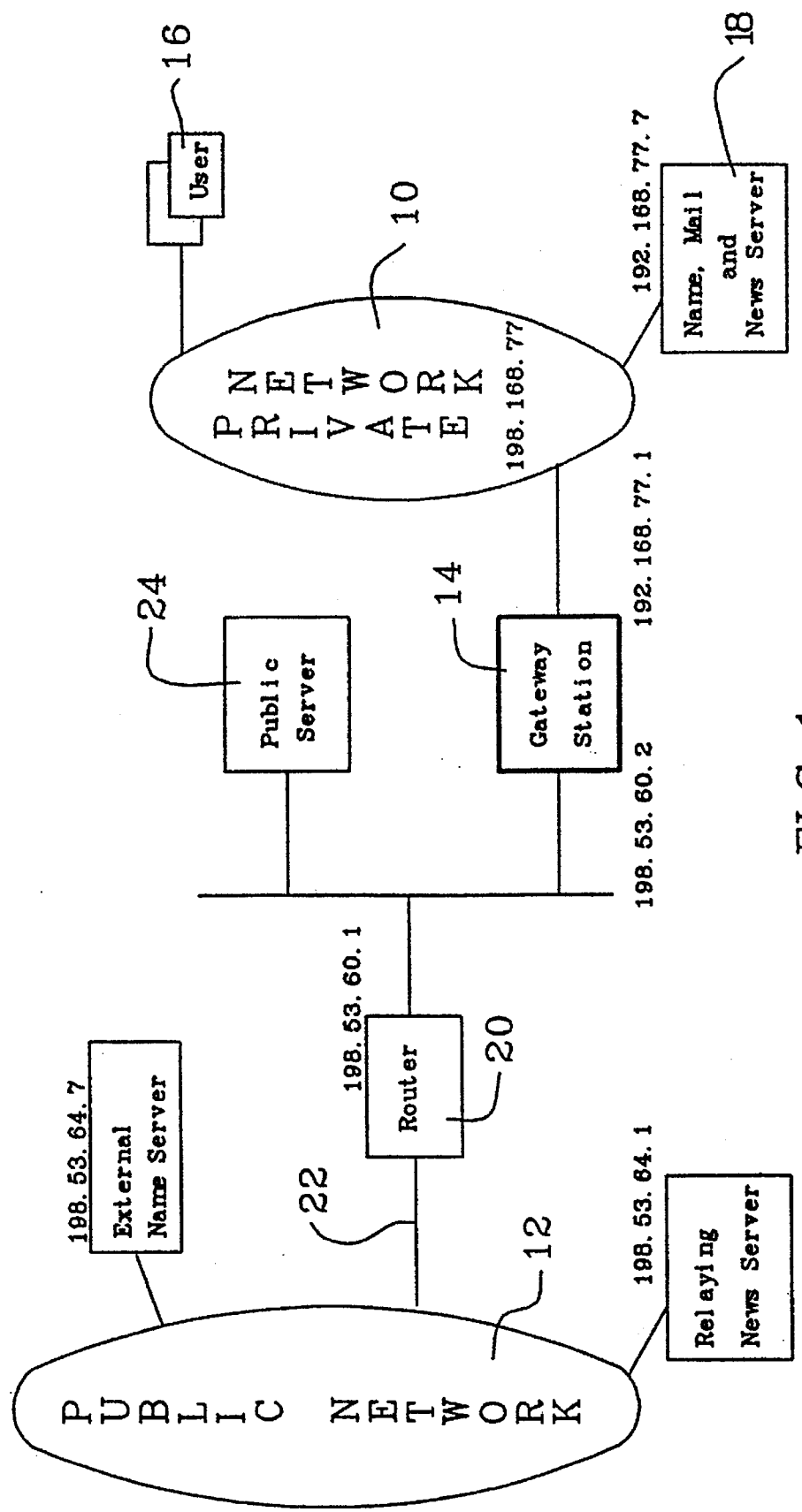
FIG. 1 is a schematic diagram of a preferred configuration for an apparatus in accordance with the invention for providing a secure gateway for data exchanges between a private network and a potentially hostile network.

FIG. 1 shows a schematic diagram of a private network 10, considered a secure network, connected to a public network 12, considered a potentially hostile network, through a gateway station 14 in accordance with the invention. In this configuration, the gateway station 14 is configured as a dual homed bastion host which provides a secure interface between the private network 10 and the public network 12.

The private network 10 includes a multiplicity of users 16, commonly referred to as clients, and one or more servers such as the name, mail and news server 18. The public network 12 may be, for example, the Internet which comprises hundreds of thousands of interconnected machines. The connection between the private network 10 and the public network 12 passes through a router 20 that relays packets over a communications line 22 which may be an ISDN, 56K level BPS, T1 or a dial up connection depending on the private network's arrangement with a public network service provider. All of the private network 10 on the private side of the gateway station 14 is unavailable to the public and is not advertised on the public network 12. The gateway station 14 does not broadcast any routes to the public network 12 and the gateway router 20 should not have any static routes defined for the private network 10. The private network 10 is therefore "routing invisible" to the public network 12. The hosts in the private network 10 can use private network addresses as defined in RFC-1597.

As can be seen in FIG. 1, the gateway station has one device address for its communications connection with the private network 10 and another device address for its communications connection with the public network 12. The device address on the public side of the gateway station 14 must be advertised on the public network 12. The private network 10 may also include one or more public servers 24 which may be accessed directly from the public network 12. The public servers 24 must have addresses which are registered and published on the public network 12. The private network 10 can only access the public servers 24 through the gateway station 14. The public server 24 is treated like any other server on the public network 12 when a user 16 initiates communication from the private network 10.

The gateway station 14 is preferably a UNIX station, well known in the art. The kernel of the operating system of the gateway station 14 is modified to disable all IP forwarding, source routing and IP redirecting functions. It is therefore impossible to have communication data packets flow directly through the gateway station 14. As will be explained below in some detail, these functions have been replaced with processes which ensure that all communications data packets from the private network 10 to the public network 12, or vice versa, are properly authenticated.

Figure 2:
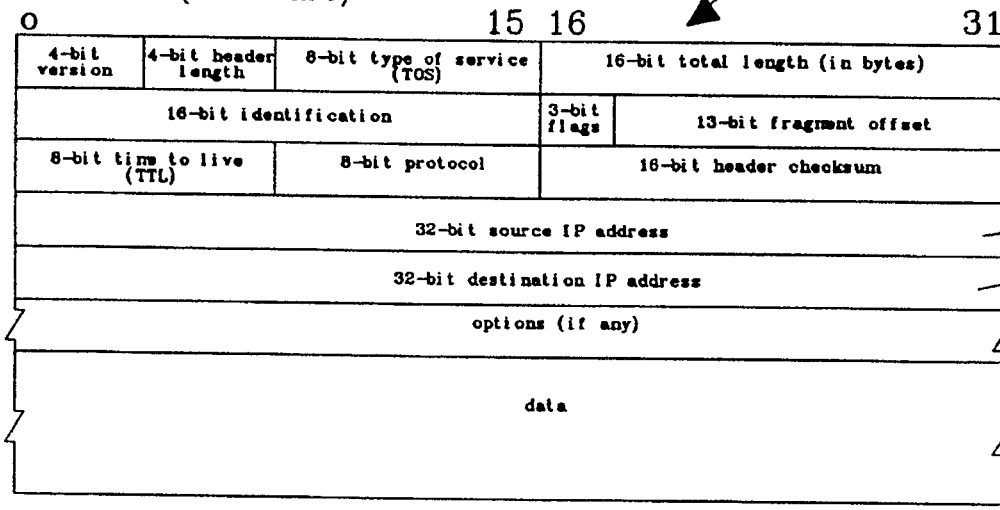
FIG. 2 is a schematic diagram of an IP header, a TCP and a UDP header in accordance with standard TCP/IP format.
Figure 2:
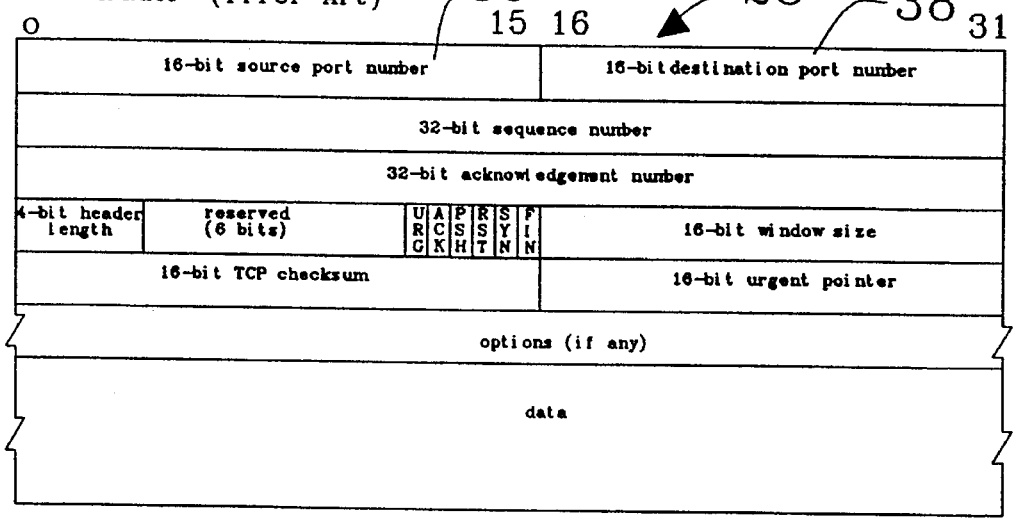
Figure 2:
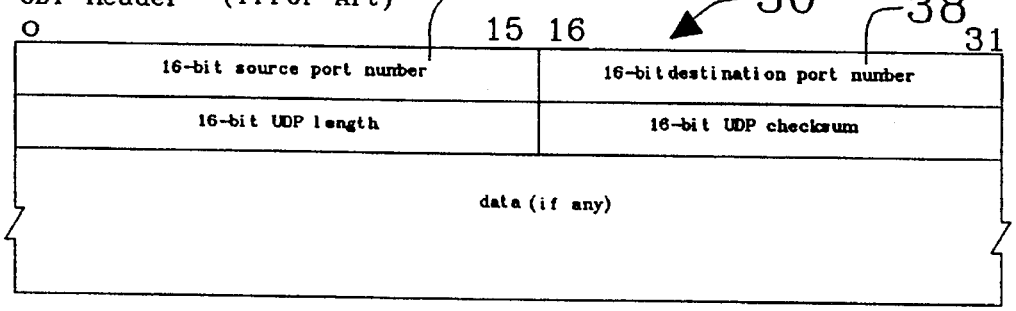

Public network communications are typically in TCP/IP format. FIG. 2 shows a schematic diagram of an IP header 26, a TCP header 28 and a UDP (User Datagram Protocol) header 30. Each IP header includes a 32-bit source IP address 32 and a 32-bit destination IP address 34. Each TCP header and each UDP header include a 16-bit source port number 36 and a 16-bit destination port number 38. Each communication data packet therefore includes a source address/source port number and a destination address/destination port number, in accordance with this communications protocol which is well known in the art. In addition to the TCP/IP communications protocol, local area networks often operate using ethernet network control software which handles intranetwork communications. In accordance with ethernet protocol, TCP/IP packets are encapsulated with an ethernet encapsulation packet to facilitate routing and ensure error free transmission.

Figure 3:
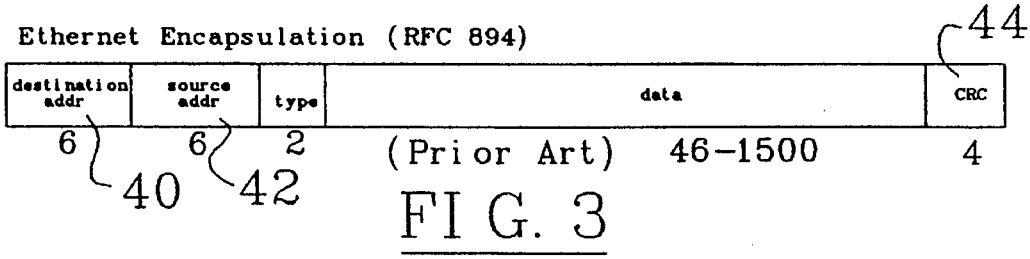
FIG. 3 is a schematic diagram of ethernet encapsulation in accordance with RFC 894.

FIG. 3 shows a schematic diagram of an ethernet encapsulation packet in accordance with RFC 894. Each encapsulation includes an ethernet destination address 40, an ethernet source address 42 and a check sum 44 for facilitating error detection and correction.

Figure 4:
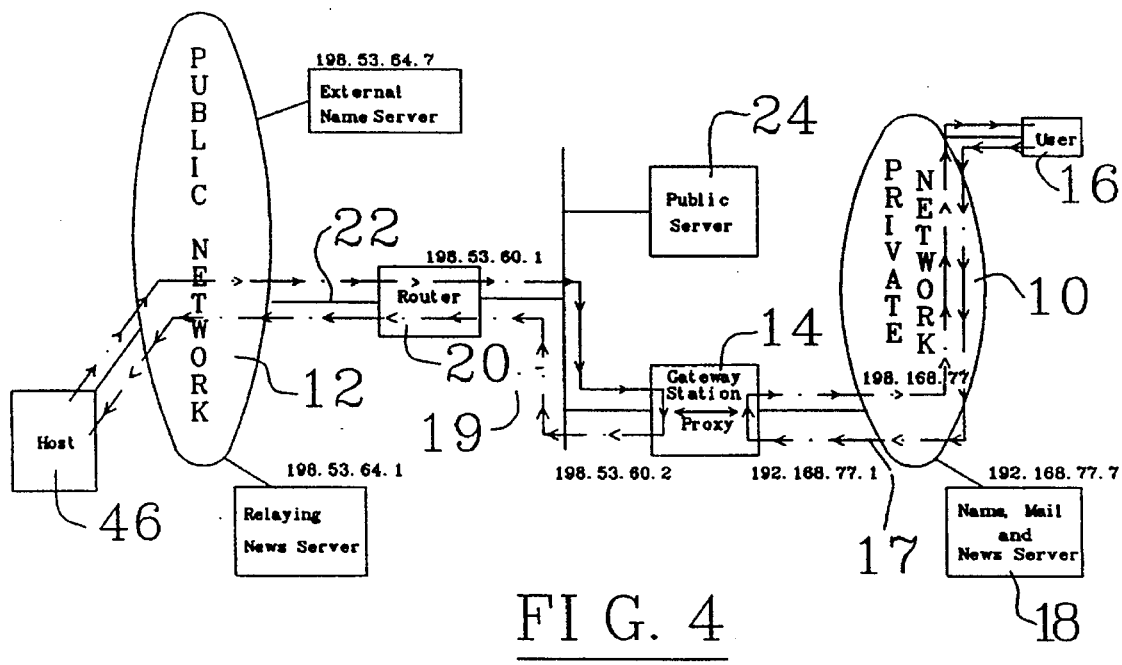
FIG. 4 is a schematic diagram of a communications flow path between a gateway station in accordance with the invention, a client on a private network and a host on a public network.

FIG. 4 illustrates schematically a typical communications session between a client station 16 on the private network 10 and a public host 46 on the public network 12. All communications between the networks are handled by the gateway station 14. When a client 16 wishes to communicate with the public network 12, such as in accessing a public host 46, the client 16 issues a network command as if the client were not behind a firewall. For instance, client 16 may issue the command:

Telnet Target.Machine

The private network 10 is configured so that all packets directed to the public network 12 are encapsulated with the ethernet destination address (192.168.77.1) of the gateway station 14. A TCP/IP packet encapsulated with the ethernet destination address of the gateway station 14 is therefore dispatched by the client 16. A normally configured UNIX device will not accept for processing TCP/IP packets which do not have an IP destination address equal to its own IP address. The kernel of the operating system of the gateway station 14 is modified so that the gateway station 14 will accept for processing any TCP/IP packet having an encapsulation destination address 40 that matches the device address of the gateway station 14. When the gateway station 14 receives the client packet containing the Telnet command, a process is initiated on the gateway station 14 which responds to the client 16 to establish a communication session 17 as if it were the target machine. As will be explained below in detail, the process then authenticates the client's authorization to access the requested service and if the client 16 is determined to have the required authorization, the gateway station 14 initiates a second communications process 19 with the remote host 46 in which the gateway station 14 simulates the client 16 without revealing the client address. Once the two communication sessions 17, 19 are operative, communication is effected between the client 16 and the host 46 by passing communication data between the two interdependent communication sessions. This is accomplished by a process that operates at the application level on the gateway station 14, as will be explained in detail below. The process accepts communication packets passed from the IP layer of the gateway station 14 by the modified operating system kernel, extracts the data from the packets and passes the data to the appropriate interdependent communications session. Data sensitivity checking is preferably performed before packet data is released to the appropriate interdependent communications session. Data sensitivity checking can prevent protocol piggybacking and other sophisticated intrusion techniques. Data sensitivity checking is performed using application level algorithms, some of which are well known in the art, but new algorithms are still being developed. All of this processing is completely transparent to client 16 because all communications appear to be direct to host 46. Host 46 likewise cannot detect that communications with client 16 are not direct.

Figure 5:
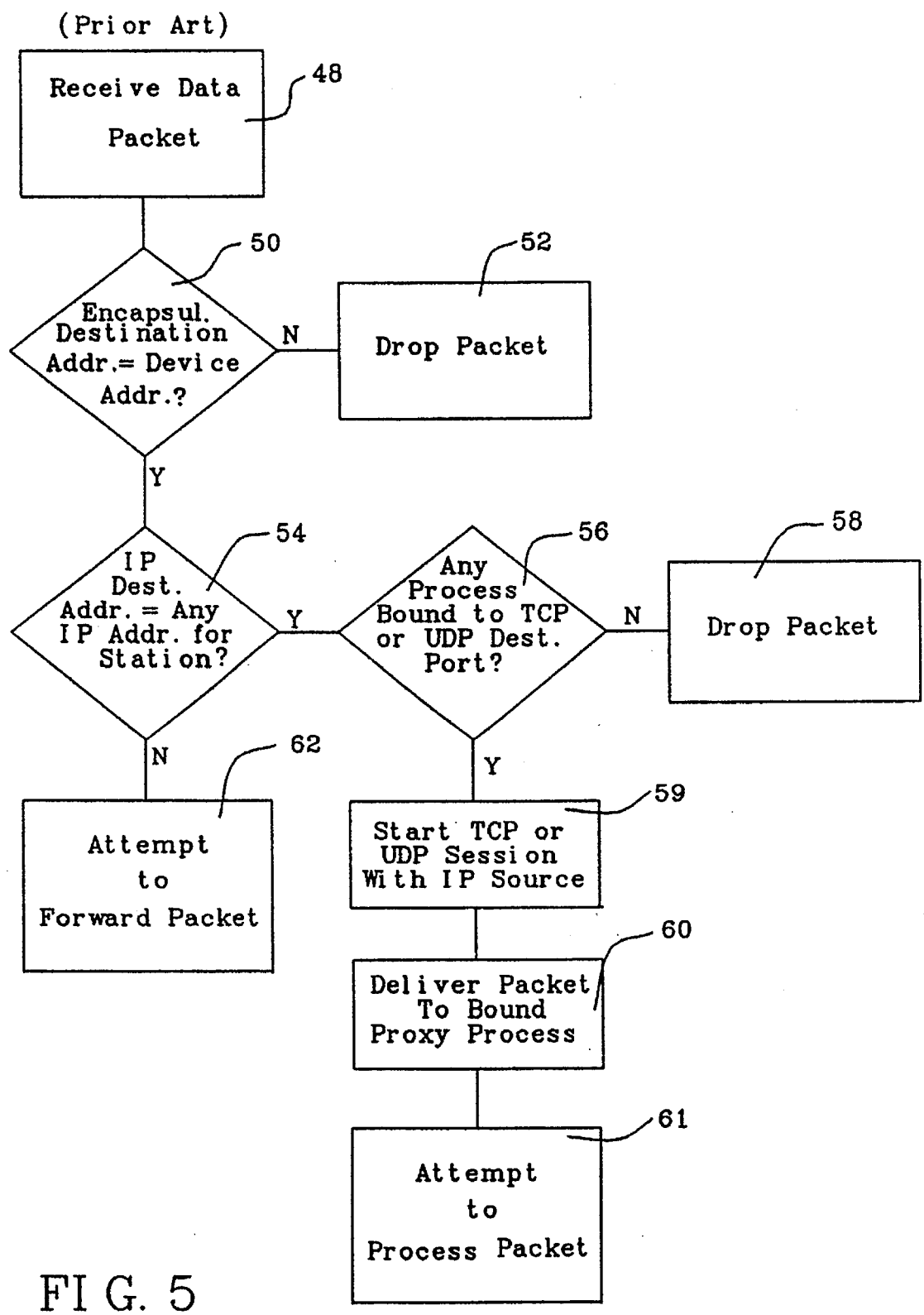
FIG. 5 is a flow diagram of a general overview of TCP routing by the kernel of a UNIX station in accordance with the prior art.

FIG. 5 shows a general overview of the way in which a prior art UNIX operating system kernel handles data communication packets. In a first step 48, a data packet is received by a UNIX workstation (not illustrated). The encapsulation address (typically an ethernet encapsulation destination address 40, see FIG. 3) is checked to determine whether it matches a device address of the station in step 50. If the addresses do not match, the packet is dropped in step 52. If the addresses match, the IP destination address 34 (see FIG. 2) is examined to determine whether it matches an IP address of the station in step 54. If a match is found, the destination port is examined in step 56 to determine whether there is a process bound to a communications port indicated as the destination port by a TCP or UDP portion of the packet that indicates the destination port number 38 (see FIG. 2). If no process is bound to the destination port, the packet is dropped in step 58. Otherwise, the kernel starts a TCP or a UDP session with the IP source in step 59, and delivers the packet to the bound process in step 60. Thereafter, the packet is processed by the process bound to the destination port in step 61, in a manner well known in the art. If the IP destination address does not match any IP address for the station, the kernel attempts to forward the packet in step 62 by consulting routing tables in a process which is also well understood by those skilled in the art.

Figure 6:
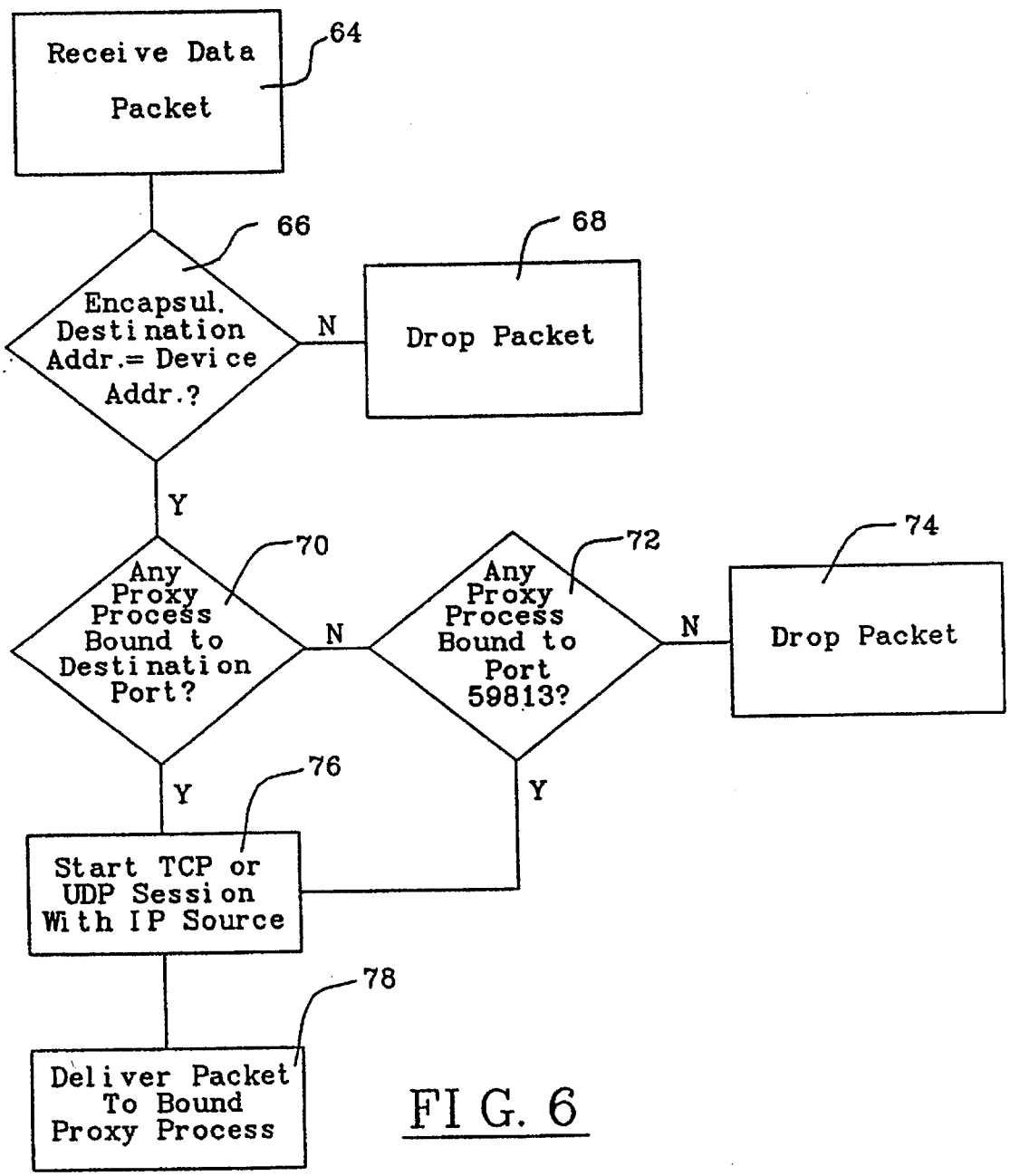
FIG. 6 is a flow diagram of a general overview of TCP routing by a modified UNIX kernel in accordance with the invention.

FIG. 6 is a flow diagram of a general overview of packet processing by a UNIX operating system kernel modified in accordance with the invention. In order to understand the process completely, it is important to understand that the gateway station 14 (see FIG. 1) is configured by a systems administrator using configuration programs supplied with the gateway station 14. When the gateway station 14 is initialized, a system configuration file is examined to determine what network services are to be supported by the gateway station 14. In order to maximize performance efficiency of the gateway station 14, commonly used services are supported by processes adapted to most efficiently handle communications for each respective service. These processes are called "proxies". On system initialization, any proxy given operating rights by the system administrator is said to "bind" to the port to which the proxy has been assigned. Thereafter, the process is said to be "bound" to the port. In accordance with the invention, the gateway station 14 is also supplied with a generic proxy that is assigned to port 59813. This port assignment is an arbitrary assignment and another port number may be used. When the gateway station 14 is initialized, the generic proxy binds to port 59813, provided that the systems administrator has given it operating rights to do so.

With reference again to FIG. 6, the modified kernel receives a packet in step 64 in the same manner as an unmodified prior art kernel. The packet is examined to determine whether the encapsulation destination address 40 (see FIG. 3) equals the device address of the gateway station 14 in step 66. If no match is found, the packet is dropped in step 68. If the encapsulation destination address 40 equals the device address of the gateway station 14, the destination port of the TCP or UDP portion of the packet is examined to determine the destination port number 38 (see FIG. 2) and whether there is a process bound to that destination port in step 70. The IP destination address 34 of the packet is ignored while making this determination. If no proxy process is bound to the destination port of the data packet, the kernel checks port 59813 to determine whether the generic proxy process is bound to that port in step 72. If the generic proxy process is not bound to port 59813, the packet is dropped in step 74. If it is determined that a proxy process is bound to a port which can serve the destination port number 38 in either of steps 70 or 72, a session (TCP or UDP) is initiated with the packet source IP address 32 in step 76 and in step 78, the packet is delivered by the kernel to the proxy process designated in steps 70, 72. This critical modification of the operating system kernel permits the kernel, within the permission boundaries imposed by a systems administrator, to "listen" to all 64K ports available for communication. Appendix A attached hereto is a printed listing of the modified source code in the kernel.

Figure 7A:
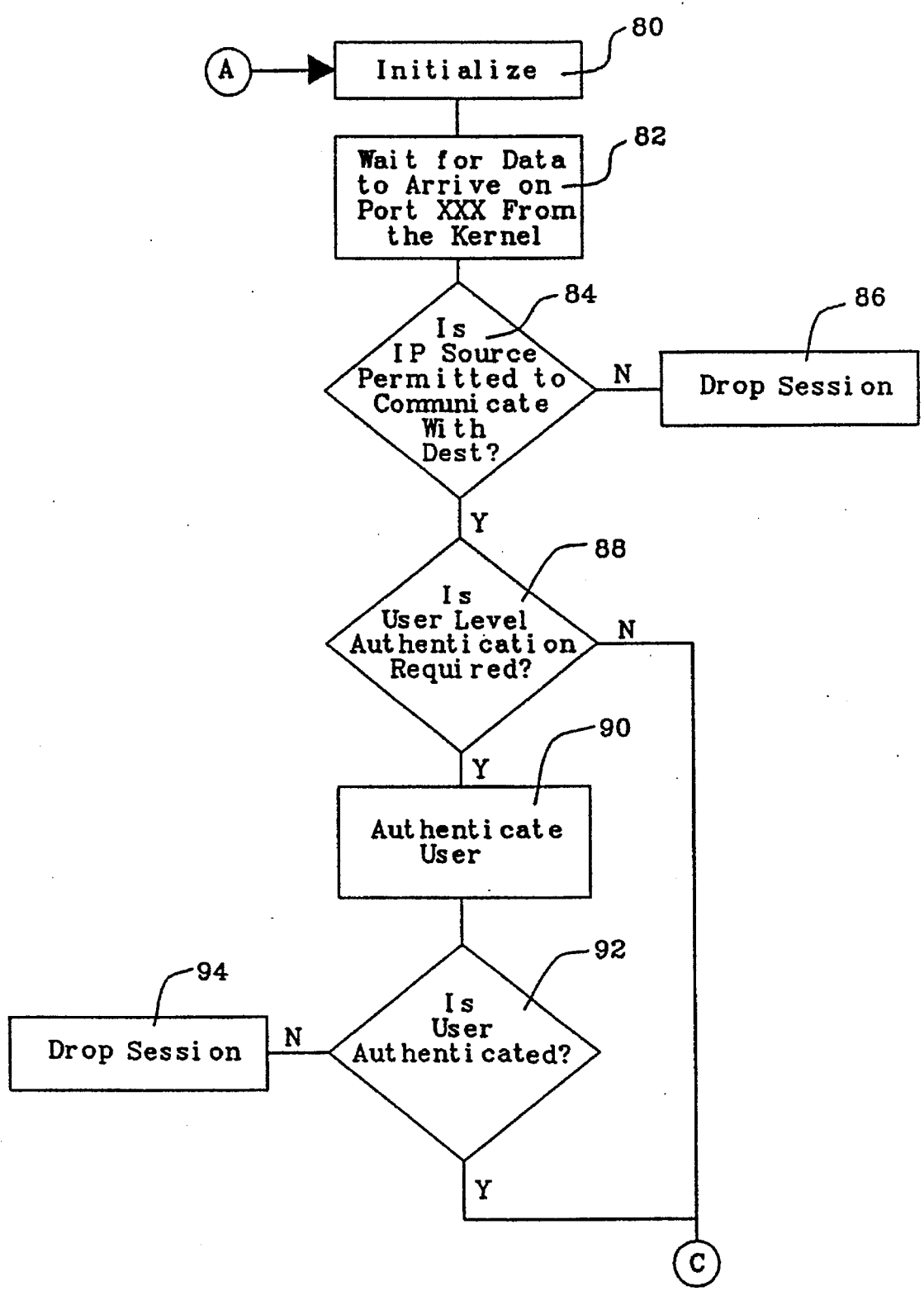
FIG. 7a is a first portion of a flow diagram of a general overview of the implementation of the invention at the application level of a gateway station.
Figure 7B:
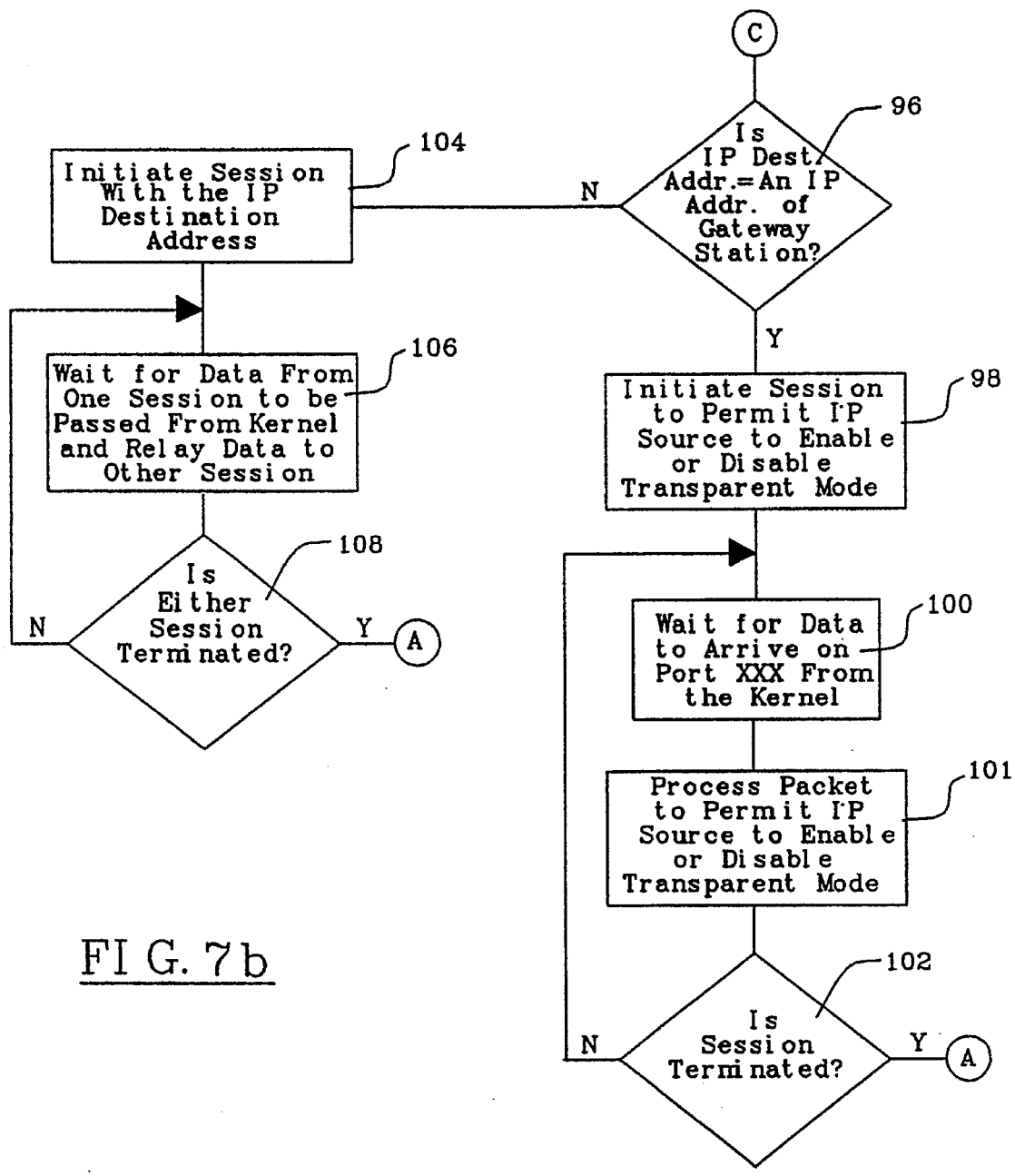

FIGS. 7a and 7b show a flow diagram of a general overview of processing at the application or proxy level of operations on the gateway station 14 in accordance with the invention. While this general overview shows a simple single user process, it will be understood by those skilled in the art that all proxies in accordance with the invention are multi-tasking proxies which can service a plurality of users simultaneously by creating "sockets" for multi-task organization in a manner well understood in the art.

In step 80 of FIG. 7a, the proxy is initialized. The proxy may be any one of a number of proxies. As noted above, in order to maximize the performance of a gateway station 14, certain customized proxies handle certain services. In particular, the preferred embodiment of the invention includes at least the following customized proxies:

proxy—Telnet (port 23)

proxy—FTP (port 21)

proxy—Gopher (port 70)

proxy—TCP (port xxx or port 59813)

UDP—relay (port xxx or port 59813)

These custom proxies are adapted to most efficiently handle the services with which they are associated. Other custom proxies can, of course, be added to the proxy processes which are bound to ports on the gateway station 14. If a data packet has a destination port number 38 that is determined to point to a port to which a custom proxy process is bound, the packet is passed by the kernel to that custom proxy process in step 82 where the custom proxy process waits for packets to arrive on the port to which it is bound, represented by "port xxx" in the diagram. As explained above with relation to FIG. 6, if the destination port number 38 of a data packet does not point to a port to which a custom proxy process is bound, the packet is delivered by the kernel to port 59813. Proxy 59813 is the generic proxy process which is designated to handle any request for service for which a customized proxy process does not exist. Although the generic proxy process is literally bound to a specific port, such as port 59813, in combination with the modified kernel it is operationally bound to every port to which a custom proxy process is not bound. Thus a versatile gateway station 14 which can handle any TCP/IP communications session is provided.

When the packet is passed by the kernel in step 82 to a bound proxy process, the proxy process determines whether the source IP address 32 is permitted to communicate with the destination IP address in step 84. This is accomplished by reference to a rule base maintained by a systems administrator of the private network. Rule bases are well understood in the art and their structure is common general knowledge. Preferably, the rule base in accordance with the preferred embodiment of the invention includes a minimum of the following elements in the rule set to determine authorization:

IP source address

IP destination address

Service required (Telnet, Archie, Gopher, WAIS, etc.)

User ID

Password

If the IP source address 32 is determined in step 84 not to be authorized for the requested service, the gateway station 14 drops the communication session in step 86. Otherwise, the proxy determines whether user level authentication is required in step 88. User level authentication is also under the control of the systems administrator. For example, the systems administrator may not require any authentication of users on the private network ion the theory that the private network is only accessible to secure individuals. On the other hand, the systems administrator has the option of requiring user level authentication for all users or any selected user. Even if user level authentication is required, in accordance with the preferred embodiment of the invention a user can authenticate and enable transparent mode wherein authentication need not be repeated for subsequent sessions for as long as authentication is maintained, as will be explained below in more detail.

If user level authentication is determined to be required in step 88, the proxy process authenticates the user in step 90. Authentication is preferably accomplished by requiring the user to enter an identification code and a password in a manner well known in the art. The identification code and the password entered are verified in a user authentication data base (not illustrated), the structure and operation of which are also well known in the art. In step 92, the gateway station 14 determines whether the user has authenticated by referencing the user authentication data base. If the user is not successfully authenticated, the session is dropped in step 94. If it is determined that no authentication is required in step 88, or if the user successfully authenticates in step 92, the IP destination address 34 of the packet is examined to determine if it is an IP address of the gateway station 14 in step 96 (see FIG. 7*b*). Step 96 is preferably only executed by the custom proxies for Telnet, FTP and Gopher, as will be explained below in detail. If the IP destination address 34 of the packet corresponds to an IP address of the gateway station 14, the gateway station starts a session to permit the user to enable or disable transparent mode in step 98, as will also be explained below. In step 100, the proxy process waits for communication packets to arrive on the port "xxx", which is the port on which the communications session was initiated, where it is delivered by the modified kernel. When a communications packet arrives, it is processed by the proxy process to permit the IP source to enable or disable transparent mode in step 101. Thereafter, the proxy process determines in step 102 whether the session has ended and if not it returns to step 100 to wait for a data packet to arrive on the port. Otherwise it returns to step 80 (see FIG. 7*a*) to initialize for a new session. If the IP destination address 34 of the packet does not match an IP address of the gateway station 14, a second communication session is established in step 104. The second communication session is established between the gateway station 14 and the IP destination address 34/TCP destination port number 38 indicated by the packet. The second communication session established in step 104 is established exclusively by the proxy process, all operations being completely transparent to the IP source. Once the second communications session is established, the proxy process waits for data packets from each session in step 106. The data packets are delivered by the kernel to the proxy process which relays the data portion of each packet from one session to the other so that the two interdependent sessions appear to the IP source and to the IP destination to be one direct session between a client source and a host destination. Data sensitivity checking may be accomplished by the proxy process before relaying the data from one session to the other. Data sensitivity checks ensure that the gateway station 14 provides a very secure interface that is, for all practical purposes, impossible for intruders to breach.

Thus a completely transparent firewall is provided which permits a security administrator to exercise potent control over the access to the private network. In step 108, the proxy process checks to determine whether either of the sessions is terminated. If either session terminates, the other session is likewise terminated and the proxy process returns to step 80 for initialization. The custom proxy processes in accordance with the invention are public domain proxy processes which have been modified to cooperate with the kernel in accordance with the methods of the invention. Appendix B attached hereto is a printed listing of the modifications made to the public domain proxies for the Telnet proxy and the FTP proxy. The principles illustrated may be applied by a person skilled in the art to any public domain or proprietary proxy process.

One of the significant features of the invention is the fact that the proxy process which executes in accordance with the flow diagram shown in FIG. 7 may be the generic proxy process, which can handle any request for service for which a customized proxy process does not exist. The generic proxy process in accordance with the invention is a proprietary TCP proxy. A complete source code listing of the proxy TCP is attached hereto as Appendix D. As explained above, in the preferred embodiment of the invention, the generic proxy process is bound to port 59813, but the specific port to which the proxy process is bound is substantially immaterial. The generic proxy process increases many fold the versatility of gateway station 14 and permits the gateway station to handle any communications session, including sessions which use port numbers dynamically allocated in real time by the communicating systems. It also provides a secure gateway which is adapted to support, without modification, new service offerings on the public network 12. If a new service offering becomes a popular service for which there is demand, a customized proxy can be written for that service. During development and testing of the customized proxy, however, the new service can be supported by the generic proxy process. Thus a versatile, secure internetwork gateway is provided which supports any known or future service available on a public network. p The gateway is completely transparent to users in all instances except when a user authentication is requested. In that instance, users may be authorized to enter authentication requests to enable a transparent mode of operation wherein subsequent sessions require no further authentication, and the gateway station 14 is completely transparent to the user. In accordance with the preferred embodiment of the invention, transparent mode can be enabled using a Telnet session, an FTP session or a Gopher session. To enable transparent mode using the Telnet program, a Telnet session is started with gateway station 14 as follows:

your-host % telnet gatewaystation.company.com
    Trying 198.53.64.2
    Connected to gatewaystation.company.com
    Escape character is '^]'
    gatewaystation proxy-telnet ready:
    Username: You
    Password: xxxxxxx
    Login Accepted
    proxy-telnet>enable
    proxy-telnet>quit
    Disconnecting . . .
    Connection closed by foreign host.
    your-host %

A user may also authenticate and enable transparent mode using the FTP program as follows:

your-host % FTP gatewaystation.company.com
    Connected to gatewaystation.company.com
    220 gatewaystation proxy-FTP ready:
    Name (gatewaystation.company.com:you): You
    331 Enter authentication password for you
    Password: xxxxxxx
    230 User authentication to proxy
    ftp>quote enable
    Transparent mode enabled
    ftp>quit
    your-host%

In the preferred embodiment of the invention, a proprietary Gopher proxy is enabled to automatically initiate transparent mode after the user has successfully authenticated to the gateway station 14 by entering a valid user identification and password, whenever a Gopher session is requested and user authentication is required. This user authentication capability is a novel feature for a Gopher proxy. The proprietary source code for the novel Gopher proxy is appended hereto as Appendix C.

The modes for implementing transparent mode are, of course, arbitrary and may be redesigned or reassigned to other programs or proxies as those skilled in the art deem appropriate. Once the transparent mode is enabled, an authentication directory is updated by creating a file entry for the source IP address 32. The authentication files include a creation time variable which is automatically set to the system time when the file is created. This creation time variable is used to track the time of authentication. The files also include a last modification time variable which is automatically updated by the system each time the file is modified. By rewriting the authentication file each time a user initiates a new communications session through the gateway station 14 the time of last use of the gateway station can be tracked. This authentication directory is inspected periodically and user files are deleted from the authentication directory base on any number of predetermined criteria. In accordance with the preferred embodiment, the user file is deleted from the authentication directory if the user has not initiated a communications session through the gateway station for a period of time predefined by the systems administrator. In addition, the user file may be deleted from the authentication directory at a predetermined time of day defined by the system administrator. It is therefore possible to have the authentication of all users of the gateway station 14 revoked at a specified time of day, such as the end of the business day. This further fortifies the security of the gateway.

It is apparent that a novel and particularly invulnerable gateway has been invented. The gateway is efficient as well as secure. It will be readily apparent to those skilled in the art that modification may be made to the preferred embodiment described above without departing from the scope of the invention as expressed in the appended claims.

I claim:

1. A method of providing a secure gateway between a private network and a potentially hostile network, comprising the steps of:

(a) addressing communications packets directly to a host on the potentially hostile network as if there were a communications path to the host, but encapulating the packets with a hardware destination address that matches a device address of the gateway;

(b) accepting at the gateway communications packets from either network that are encapsulated with a hardware destination address which matches the device address of the gateway;

(c) determining at the gateway whether there is a process bound to a destination port number of an accepted communications packet;

(d) establishing transparently at the gateway a first communications session with a source address/source port of the accepted communications packet if there is a process bound to the destination port number, else dropping the packet;

(e) establishing transparently at the gateway a second communications session with a destination address/ destination port of the accepted communications packet if a first communications session is established; and (f) transparently moving data associated with each subsequent communications packet between the respective first and second communications sessions, whereby the first session communicates with the source and the second session communicates with the destination using the data moved between the first and second sessions.

2. A method of providing a secure gateway between a private network and a potentially hostile network as claimed in claim 1 wherein the step of determining involves checking to determine if a process is bound to the destination port number, and passing the packet to a generic process if a process is not bound to the destination port number, the generic process acting to establish the first and second communications sessions and to move the data between the first and second communications sessions.

3. A method of providing a secure gateway between a private network and a potentially hostile network as claimed in claim 1 wherein the method further involves the steps of:

a) checking a rule base to determine if the source address requires authentication; and b) authenticating the source by requesting a user identification and a password and referencing a database to determine if the user identification and password are valid.

4. A method of providing a secure gateway between a private network and a potentially hostile network as claimed in claim 1 wherein the method further involves the steps of:

a) referencing a rule base after the first communications session is established to determine whether the source address is permitted access to the destination address for a requested type of service; and b) cancelling the first communications session if the rule base does not include a rule to permit the source address to access the destination address for the requested type of service.

5. A method of providing a secure gateway between a private network and a potentially hostile network as claimed in claim 3, wherein the method further involves the steps of:
   a) creating a user authentication file which contains the source address of the authenticated user in a user authentication directory; and
   b) referring to the authentication file to determine if a source address has been authenticated each time a new communications session is initiated so that the gateway is completely transparent to an authenticated source.

6. A method of providing a secure gateway between a private network and a potentially hostile network as claimed in claim 5 wherein the user authentication file includes a creation time variable which is set to a system time value when the user is authenticated.

7. A method of providing a secure gateway between a private network and a potentially hostile network as claimed in claim 6 wherein the method further involves the steps of:
   a) updating a modification time variable of the authentication file each time the user initiates a new communications session through the gateway station.

8. A method of providing a secure gateway between a private network and a potentially hostile network as claimed in claim 7 wherein the method further involves the steps of:
   a) periodically checking each user authentication file to determine whether one of a first difference between the authentication time variable and the system time and a second difference between the modification time variable and the system time has exceeded a predefined threshold; and
   b) deleting the user file from the user authentication directory if the threshold has been exceeded by each of the first and second differences.

9. A method for providing a secure gateway between a private network and potentially hostile network as claimed in claim 1 wherein the method further involves the steps of:
   a) performing a data sensitivity check on the data associated with each packet as a step in the process of moving the data between the respective first and second communications sessions.

10. A method of providing a secure gateway between a private network and a potentially hostile network, comprising the steps of:
   (a) addressing communications packets directly to a host on the potentially hostile network as if there were a communications path to host, but encapulating the packets with a hardware destination address that matches a device address of the gateway;
   (b) accepting from either network all TCP/IP packets that are encapsulated with a hardware destination address which matches the device address of the gateway;
   (c) determining whether there is a proxy process bound to a port for serving a destination port number of an accepted TCP/IP packet;
   (d) establishing a first communications session with a source address/source port number of the accepted TCP/IP packet if there is proxy process bound to the port for serving the destination port number, else dropping the packet;
   (e) determining if the source address/source port number of the accepted packet is permitted to communicate with a destination address/destination port number of the accepted packet by referencing a rule base, and dropping the packet if a permission rule cannot be located;
   (f) establishing a second communications session with the destination address/destination port number of the accepted TCP/IP packet if a first communications session is established and the permission rule is located; and
   (g) transparently moving data associated with each subsequent TCP/IP packet between the respective first and second communications sessions, whereby the first session communicates with the source and the second session communicates with the destination using the data moved between the first and second sessions.

11. A method of providing a secure gateway between a private network and a potentially hostile network as claimed in claim 10 wherein the step of determining involves checking a table to determine if a custom proxy process is bound to the destination port number, and passing the packet to a generic proxy process if a custom proxy process is not bound to the destination port number, the generic proxy process being executed to establish the first and second communications sessions and to move the data between the first and second communications sessions.

12. A method of providing a secure gateway between a private network and a potentially hostile network as claimed in claim 10 wherein the step of establishing a first communications session with a source address/source port number further involves the steps of:
   a) checking a rule base to determine if the source requires authentication;
   b) checking an authentication directory to determine if an authentication file exists for the source in an instance where the source requires authentication; and
   c) if the source requires authentication and an authentication file for the source cannot be located, authenticating the source by requesting a user identification and a password and referencing a user identification database to determine if the user identification and password are valid.

13. A method of providing a secure gateway between a private network and a potentially hostile network as claimed in claim 12 wherein the method further involves the steps of:
   a) referencing a rule base as a first step after the first communications session is established to determine whether the user identification/password at the source address is permitted to communicate with the destination address for a requested service; and
   b) cancelling the first communications session if the rule base does not include a rule to permit the user identification/password at the source address to communicate with the destination address for the requested type of service.

14. A method of providing a secure gateway between a private network and a potentially hostile network as claimed in claim 12, wherein the method further involves the steps of:
   a) creating a user authentication file which contains the source address of the authenticated user in a user authentication directory; and
   b) referring to the authentication file to determine if a source address has been authenticated each time a new communications session is initiated so that the gateway is completely transparent to an authenticated source having an authentication file in the authentication directory.

15. A method of providing a secure gateway between a private network and a potentially hostile network as claimed in claim 14 wherein a file creation time variable which is automatically set by an operating system of the gateway station to a system time value when a file is created, is used to monitor a time when the user is authenticated.

16. A method of providing a secure gateway between a private network and a potentially hostile network as claimed in claim 14 wherein the method further involves the steps of:

a) rewriting the user authentication file each time the user initiates a new communications session through the gateway station so that a modification time variable in the authentication file is automatically updated by the operating system of the secure gateway.

17. A method of providing a secure gateway between a private network and a potentially hostile network as claimed in claim 16 wherein the method further involves the steps of:

a) periodically checking each user authentication file to determine whether one of a first difference between the authentication time variable and the system time and a second difference between the modification time variable and the system time has exceeded a predefined threshold; and b) deleting the user file from the user authentication directory if the threshold has been exceeded by both of the first and second differences.

18. A method for providing a secure gateway between a private network and potentially hostile network as claimed in claim 10 wherein the method further involves the steps of:

a) performing a data sensitivity check on the data portion of each packet as a step in the process of moving the data between the respective first and second communications sessions, whereby the TCP/IP packet is passed by a modified kernel of an operating system of the secure gateway to the proxy process which extracts the data from the packet and passes the data from a one of the first and second communications sessions to a proxy process which operates at an application layer of the gateway station and the proxy process executes data screening algorithms to screen the data for elements that could represent a potential security breach before the data is passed to the other of the first and second communications sessions.

19. Apparatus for providing a secure gateway for data exchanges between a private network and a potentially hostile network, comprising in combination:

a gateway station adapted for connection to a telecommunications connection with each of the private network and the potentially hostile network;

an operating system executable by the gateway station, a kernel of the operating system having been modified so that the operating system:

a) cannot forward any communications packet from the private network to the potentially hostile network or from the potentially hostile network to the private network; and b) will accept for processing any communications packet from either of the private network and the potentially hostile network provided that the packet is encapsulated with a hardware destination address that matches the device address of the gateway station on the respective network; and at least one proxy process executable by the gateway station, the at least one proxy process being adapted to transparently initiate a first communications session with a source of an initial data packet accepted by the operating system and to transparently initiate a second communications session with a destination of the packet without intervention by the source, and to transparently pass the data portion of packets received by the first communications session to the second communications session and to pass the data portion of packets received by the second communications session to the first communications session, whereby the first session communicates with the source using data from the second session and the second session communicates with the destination using data received from the first session.

20. Apparatus for providing a secure gateway for data exchanges between a private network and a potentially hostile network as claimed in claim 19 wherein the operating system is a Unix operating system.

21. Apparatus for providing a secure gateway for data exchanges between a private network and a potentially hostile network as claimed in claim 19 wherein the at least one proxy process includes modified public domain proxy processes for servicing Telnet, FTP, and UDP communications.

22. Apparatus for providing a secure gateway for data exchanges between a private network and a potentially hostile network as claimed in claim 19 wherein the at least one proxy process is a generic proxy process capable of servicing any network service which may be communicated within TCP/IP protocol, on any one of the 64K TCP/IP communications ports.

23. Apparatus for providing a secure gateway for data exchanges between a private network and a potentially hostile network as claimed in claim 22 wherein the kernel is modified so that it will pass to the generic proxy process any communications packet having a destination port number that indicates a port to which no custom proxy process is bound, if the generic proxy process is bound to a predefined communications port when the communications packet is received by the kernel.

24. Apparatus for providing a secure gateway for data exchanges between a private network and a potentially hostile network as claimed in claim 20 wherein the gateway station is a Unix station.

25. Apparatus for providing a secure gateway for data exchanges between a private network and a potentially hostile network as claimed in claim 19 wherein the apparatus further includes programs for providing a security administrator with an interface to permit the security administrator to build a rule base for controlling communications through the gateway station.

26. Apparatus for providing a secure gateway for data exchanges between a private network and a potentially hostile network as claimed in claim 19 wherein the at least one proxy process includes domain proxy processes for servicing Gopher and TCP communications.

27. Apparatus for providing a secure gateway for data exchanges between a private network and a potentially hostile network as claimed in claim 19 wherein the Gopher proxy process is enabled to authenticate users whenever a Gopher session is initiated and user authentication is required.

28. Apparatus for providing a secure gateway for data exchanges between a private network and a potentially hostile network as claimed in claim 22 wherein the generic proxy process capable of servicing any network service which may be communicated within TCP/IP protocol, on any one of the 64K TCP/IP communications ports is a TCP proxy process.

29. A computer system for providing a secure gateway between a private network and a potentially hostile network, comprising:

a) means for accepting from either network all communications packets that are encapsulated with a hardware destination address which matches the device address of the gateway;

b) means for determining whether there is a process bound to a destination port number of an accepted communications packet;

c) means for establishing a first communications session with a source address/source port of the accepted communications packet if there is a process bound to the destination port number, else dropping the packet;

d) means for transparently establishing, without intervention from the source, a second communications session with a destination address/destination port of the accepted communications packet if a first communications session is established; and e) means for transparently moving data associated with each subsequent communications packet between the respective first and second communications sessions, whereby the first session communicates with the source and the second session communicates with the destination using the data moved between the first and second sessions.

30. A computer system providing a secure gateway between a private network and a potentially hostile network as claimed in claim 29 wherein the means for determining checks to determine if a process is bound to the destination port number, and passes the packet to a generic process if a process is not bound to the destination port number, the generic process acting to establish the first and second communications sessions and to move the data between the first and second communications sessions.

31. A computer system for providing a secure gateway between a private network and a potentially hostile network as claimed in claim 29 wherein the system further includes:

a) means for checking a rule base to determine if the source address requires authentication; and b) means for authenticating the source by requesting a user identification and a password and referencing a database to determine if the user identification and password are valid.

32. A computer system for providing a secure gateway between a private network and a potentially hostile network as claimed in claim 29 wherein the system further includes:

a) means for referencing a rule base after the first communications session is established to determine whether the source address is permitted to access the destination address for a requested type of service; and b) means for cancelling the first communications session if the rule base does not include a rule to permit the source address to access the destination address for the requested type of service.

33. A computer system for providing a secure gateway between a private network and a potentially hostile network as claimed in claim 32, wherein the system further includes:

a) means for creating a user authentication file which contains the source address of the authenticated user in a user authentication directory; and b) means for referring to the authentication file to determine if a source address has been authenticated each time a new communications session is initiated so that the gateway is completely transparent to an authenticated source.

34. A computer system for providing a secure gateway between a private network and a potentially hostile network as claimed in claim 33 wherein the user authentication file includes a creation time variable which is set to a system time value when the user is authenticated.

35. A computer system for providing a secure gateway between a private network and a potentially hostile network as claimed in claim 34 wherein the system further includes:

a) means for updating a modification time variable of the authentication file each time the user initiates a new communications session through the gateway station.

36. A computer system for providing a secure gateway between a private network and a potentially hostile network as claimed in claim 35 wherein the system further includes:

a) means for periodically checking each user authentication file to determine whether one of a first difference between the authentication time variable and the system time and a second difference between the modification time variable and the system time has exceeded a predefined threshold; and b) means for deleting the user file from the user authentication directory if the threshold has been exceeded by each of the first and second differences.

37. A computer system for providing a secure gateway between a private network and potentially hostile network as claimed in claim 29 wherein the system further includes:

a) means for performing a data sensitivity check on the data associated with each packet as a step in the process of moving the data between the respective first and second communications sessions.

38. A computer-readable memory encoded with computer-readable instructions for providing a secure gateway between a private network and a potentially hostile network, comprising:

a) instructions for accepting from either network all communications packets that are encapsulated with a hardware destination address which matches the device address of the gateway;

b) instructions for determining whether there is a process bound to a destination port number of an accepted communications packet;

c) instructions for transparently establishing a first communications session with a source address/source port of the accepted communications packet if there is a process bound to the destination port number, else dropping the packet;

d) instructions for transparently establishing, without intervention from the source, a second communications session with a destination address/destination port of the accepted communications packet if a first communications session is established; and e) instructions for transparently moving data associated with each subsequent communications packet between the respective first and second communications sessions, whereby the first session communicates with the source and the second session communicates with the destination using the data moved between the first and second sessions.

39. A computer readable memory as claimed in claim 38 wherein the computer readable memory comprises at least one compact disk.

40. A computer readable memory as claimed in claim 38 wherein the computer readable memory comprises at least one floppy diskette.

41. A computer readable memory as claimed in claim 38 wherein the computer readable memory comprises at least one hard disk drive.

* * * * *

UNITED STATES PATENT AND TRADEMARK OFFICE
CERTIFICATE OF CORRECTION

PATENT NO.   : 5,623,601
DATED        : April 22, 1997
INVENTOR(S)  : HUNG T. VU It is certified that error appears in the above-indentified patent and that said Letters Patent is hereby corrected as shown below:

On the title page, item [73] Assignee:

Change "Milkway Networks Corporation" to -- Milkyway Networks Corporation --.

Signed and Sealed this

Twenty-sixth Day of August, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,623,601 C1  
APPLICATION NO. : 90/011422  
DATED : May 8, 2012  
INVENTOR(S) : Vu

Page 1 of 1

It is certified that error appears in the above-identified patent and that said Letters Patent is hereby corrected as shown below:

Title Page, Item (73) Assignee Name

(73) Assignee: Mount Hamilton Partners, LLC, Mountain View, CA (US)

should read     --Network Protection Sciences, LLC, Dallas, TX (US)--.

Signed and Sealed this  
Fifteenth Day of September, 2015

Michelle K. Lee  
*Director of the United States Patent and Trademark Office*

(12) EX PARTE REEXAMINATION CERTIFICATE (8997th)
United States Patent
Vu

(10) Number: US 5,623,601 C1
(45) Certificate Issued: May 8, 2012

(54) APPARATUS AND METHOD FOR PROVIDING A SECURE GATEWAY FOR COMMUNICATION AND DATA EXCHANGES BETWEEN NETWORKS

(75) Inventor: Hung T. Vu, Ottawa (CA)

(73) Assignee: Mount Hamilton Partners, LLC, Mountain View, CA (US)

Reexamination Request:
No. 90/011,422, Jan. 7, 2011

Reexamination Certificate for:
Patent No.: 5,623,601
Issued: Apr. 22, 1997
Appl. No.: 08/342,772
Filed: Nov. 21, 1994

Certificate of Correction issued Aug. 26, 1997.

(51) Int. Cl.
*G06F 11/00* (2006.01)

(52) U.S. Cl. .......................................... 726/12; 726/14
(58) Field of Classification Search ........................ None
See application file for complete search history.

(56) References Cited

To view the complete listing of prior art documents cited during the proceeding for Reexamination Control Number 90/011,422, please refer to the USPTO's public Patent Application Information Retrieval (PAIR) system under the Display References tab.

*Primary Examiner* — Joshua Campbell

(57) ABSTRACT

An apparatus and method for providng a secure firewall between a private network and a public network are disclosed. The apparatus is a gateway station having an operating system that is modified to disable communications packet forwarding, and further modified to process any communications packet having a network encapsulation address which matches the device address of the gateway station. The method includes enabling the gateway station to transparently initiate a first communications session with a client on a first network requesting a network service from a host on a second network, and a second independent communications session with the network host to which the client request was addressed. The data portion of communications packets from the first session are passed to the second session, and vice versa, by application level proxies which are passed the communications packets by the modified operating system. Data sensitivity screening is preferably performed on the data to ensure security. Only communications enabled by a security administrator are permitted. The advantage is a transparent firewall with application level security and data screening capability.

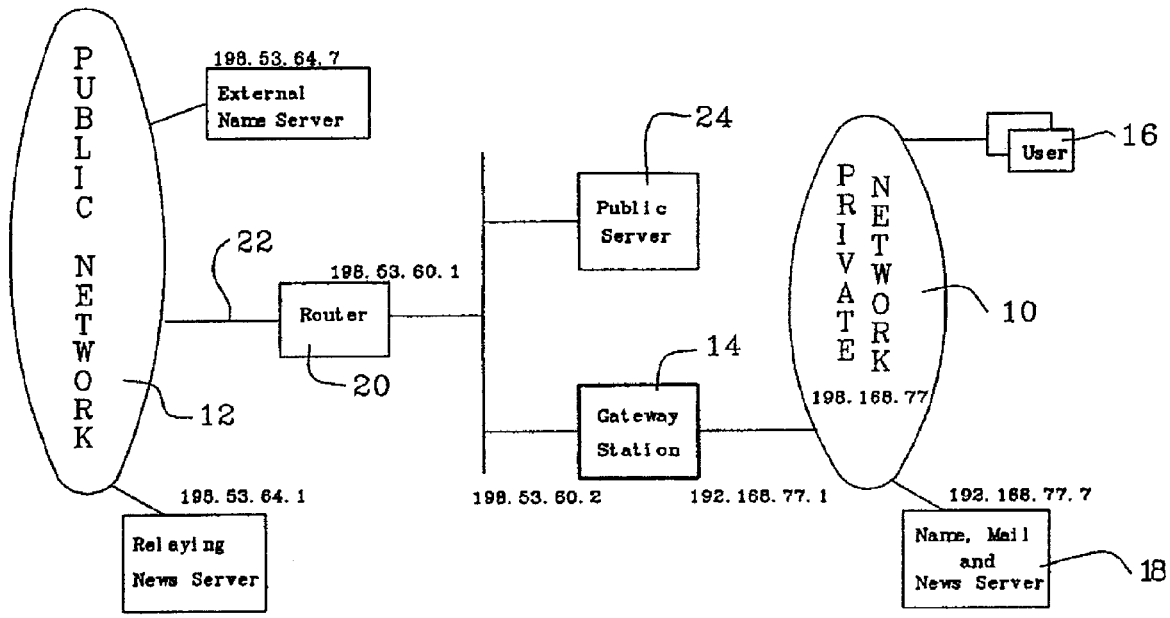

US 5,623,601 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-41 is confirmed.

New claims 42-59 are added and determined to be patentable.

42. *A method of providing a secure gateway between a private network and a potentially hostile network as claimed in claim 1 wherein the step of accepting includes accepting for processing at the gateway a communications packet from the private network that (i) is addressed directly to a host on the potentially hostile network as if there were a communications path to the host, and (ii) is encapsulated with a hardware destination address that matches a device address of the gateway.*

43. *A method of providing a secure gateway between a private network and a potentially hostile network as claimed in claim 1 wherein the accepted communications packet is received at the gateway from the private network, wherein the accepted packet is addressed directly to a host on the potentially hostile network as if there were a communications path to the host and is encapsulated with the hardware destination address that matches the device address of the gateway, and wherein transparently moving data comprises passing communications packets to at least one proxy process that is configured to operate at an application layer of the gateway.*

44. *A method of providing a secure gateway between a private network and a potentially hostile network as claimed in claim 1 wherein the subsequent communications packets received as part of the first communications session are received at the gateway from the private network, and are (i) addressed directly to a host on the potentially hostile network as if there were a communications path to the host, and (ii) encapsulated with a hardware destination address that matches a device address of the gateway.*

45. *A method of providing a secure gateway between a private network and a potentially hostile network as claimed in claim 1, further comprising:*
   *a) checking a rule base to determine if the source address requires authentication;*
   *b) determining whether a user identification and password previously provided from the source address is sufficient to authenticate the source;*
   *c) responsive to a determination that the previously provided user identification and password is sufficient to authenticate the source, authenticating the source without requesting a user identification and a password; and*
   *d) responsive to a determination that the previosuly provided user identification and password is not sufficient to authenticate the source, authenticating the source by requesting a user identification and a password and referencing a database to determine if the user identification and password are valid.*

46. *A method of providing a secure gateway between a private network and a potentially hostile network as claimed in claim 45, wherein the determination as to whether the previously provided user identification and password is sufficient to authenticate the source is based on an amount of time since the previously provided user identification and password was received from the source.*

47. *A method of providing a secure gateway between a private network and a potentially hostile network as claimed in claim 10, wherein the step of accepting from either network all TCP/IP packets includes accepting for processing at the gateway a TCP/IP packet from the private network that (i) is addressed directly to a host on the potentially hostile network as if there were a communications path to the host, and (ii) is encapsulated with a hardware destination address that matches a device address of the gateway.*

48. *A method of providing a secure gateway between a private network and a potentially hostile network as claimed in claim 10, wherein the accepted TCP/IP packet is received at the gateway from the private network, wherein the accepted TCP/IP packet is addressed directly to a host on the potentially hostile network as if there were a communications path to the host and is encapsulated with the hardware destination address that matches the device address of the gateway, and wherein transparently moving data comprises passing communications packets to a proxy process which operates at an application layer of the gateway to extract the data from the each subsequent TCP/IP packet and then pass the extracted data between the first and second communications sessions.*

49. *A method of providing a secure gateway between a private network and a potentially hostile network as claimed in claim 10, wherein the subsequent communications packets received as part of the first communications session are received at the gateway from the private network, and are (i) addressed directly to a host on the potentially hostile network as if there were a communications path to the host, and (ii) encapsulated with a hardware destination address that matches a device address of the gateway.*

50. *A method of providing a secure gateway between a private network and a potentially hostile network as claimed in claim 10, further comprising:*
   *a) checking a rule base to determine if the source requires authentication;*
   *b) checking an authentication directory to determine if an authentication file exists for the source in an instance where the source requires authentication; and*
   *c) responsive to a determination that an authentication file for the source exists and if the source requires authentication, authenticating the source without requesting a user identification and a password; and*
   *d) if the source requires authentication and an authentication file for the source cannot be located, authenticating the source by requesting a user identification and a password and referencing a user identification database to determine if the user identification and password are valid.*

51. *Apparatus for providing a secure gateway for data exchanges between a private network and a potentially hostile network as claimed in claim 19, wherein the operating system is configured such that the operating system will accept for processing by the operating system a communicatons packet from the private network that is addressed to a host on the potentially hostile network as if there were a* communications path from the private network to the host, and that is encapsulated with the hardware destination address that matches the device address of the gateway station on the private network.

52. Apparatus for providing a secure gateway for data exchanges between a private network and a potentially hostile network as claimed in claim 19, wherein the at least one proxy process is configured to operate at the application layer to transparently pass the data portion of packets between the first and second communications sessions.

53. Apparatus for providing a secure gateway for data exchanges between a private network and a potentially hostile network as claimed in claim 19, wherein the initial data packet is a communications packet received by the gateway from the private network and accepted for processing by the operating system, that is addressed to a host on the potentially hostile network as if there were a communicatons path from the private network to the host, and that is encapsulated with the hardware destination address that matches the device address of the gateway station on the private network.

54. Apparatus for providing a secure gateway for data exchanges between a private network and a potentially hostile network as claimed in claim 19, wherein the at least one proxy process is further adapted to determine whether there is a process bound to a destination port number of an accepted communications packet and passing the packet to a generic process if a process is not bound to the destination port number, the generic process acting to establish the first and second communications sessions and to move the data between the first and second communications sessions.

55. Apparatus for providing a secure gateway for data exchanges between a private network and a potentially hostile network as claimed in claim 25, wherein the rule base determines if the source address requires authentication based on a user identification and a password that matches a user identification and password maintained in a user authentication file which contains the source address of the authenticated user in a user authentication directory, and wherein the authentication file is used to determine whether a source address has been authenticated each time a new communications session is initiated, whereby the gateway is completely transparent to an authenticated source.

56. Apparatus for providing a secure gateway for data exchanges between a private network and a potentially hostile network as claimed in claim 55, wherein a modification time variable of the authentication file is updated each time the user initiates a new communications session through the gateway station and wherein the user file is deleted from the user authentication directory if one of a first difference between the authentication time variable and the system time and a second difference between the modification time variable and the system time has exceeded a predefined threshold.

57. Apparatus for providing a secure gateway for data exchanges between a private network and a potentially hostile network as claimed in claim 19 wherein the at least one proxy process is further adapted to perform a data sensitivity check is on the data associated with each packet while transparently passing the data portion of the each packet.

58. Apparatus for providing a secure gateway for data exchanges between a private network and a potentially hostile network as claimed in claim 19, wherein the at least one proxy process is further adapted to check a rule base if the source address requires authentication and to authenticate the source without requesting a user identification and a password if a previously provided user identification and password is sufficient to authenticate the source and to authenticate the source by requesting a user identification and a password and by referencing a database that determines if the user identification and password are valid if a previously provided user identification and password is not sufficient to authenticate the source.

59. Apparatus for providing a secure gateway for data exchanges between a private network and a potentially hostile network as claimed in claim 58, wherein the determination as to whether the previously provided user identification and password is sufficient to authenticate the source is based on an amount of time since the previously provided user identification and password was received from the source.

\* \* \* \* \*